(12) United States Patent
Kitajima et al.

(10) Patent No.: US 6,598,817 B2
(45) Date of Patent: Jul. 29, 2003

(54) DUAL-BEARING REEL

(75) Inventors: Keigo Kitajima, Sakai (JP); Ong San Cheng, Singapore (SG)

(73) Assignee: Shimano, Inc., Sakai (JP)

( * ) Notice: Subject to any disclaimer, the term of this patent is extended or adjusted under 35 U.S.C. 154(b) by 14 days.

(21) Appl. No.: 09/950,579

(22) Filed: Sep. 13, 2001

(65) Prior Publication Data

US 2002/0033426 A1 Mar. 21, 2002

(30) Foreign Application Priority Data

Sep. 18, 2000 (JP) ........................................ 2000-281785

(51) Int. Cl.[7] ................................................ A01K 89/00
(52) U.S. Cl. ........................................................ 242/257
(58) Field of Search ................................. 242/257, 258, 242/259, 260, 261, 262

(56) References Cited

U.S. PATENT DOCUMENTS

| | | | | |
|---|---|---|---|---|
| 3,670,985 A | * | 6/1972 | Morishita | 242/275 |
| 4,512,536 A | * | 4/1985 | Sato | 242/261 |
| 4,905,930 A | | 3/1990 | Puryear et al. | |
| 5,158,245 A | * | 10/1992 | Johansson | 242/261 |
| 5,222,995 A | * | 6/1993 | Sato | 242/258 |
| 5,330,130 A | * | 7/1994 | Sakaguchi | 242/261 |
| 5,350,133 A | | 9/1994 | Morimoto | |
| 5,772,139 A | * | 6/1998 | Sato | 242/261 |
| 5,921,490 A | * | 7/1999 | Sato | 242/261 |

FOREIGN PATENT DOCUMENTS

GB 2 260 472 A 4/1993

* cited by examiner

*Primary Examiner*—Emmanuel Marcelo
(74) *Attorney, Agent, or Firm*—Shinjyu Global IP Counselors, LLP (57) ABSTRACT

Dual-bearing reel, having two clutch-operating handles for performing different clutch operations, designed to facilitate maintenance work on the interior of the handle-mounting side. A mechanism mounting plate (11) for the dual-bearing reel is provided on a side cover (7) on the handle-mounting side of the reel body, and meanwhile on a side plate (9) on the handle-mounting side, which lets the spool (12) pass through, two clutch-operating handles (17), (27) are fitted for shifting without coming of. Further, a clutch plate (55) that, linked to the two clutch-operating handles (17), (27) engages with a clutch switching mechanism, is provided within the mechanism mounting space.

10 Claims, 9 Drawing Sheets

DUAL-BEARING REEL

BACKGROUND OF THE INVENTION

1. Technical Field

The present invention relates to dual-bearing reels; in particular to dual-bearing reels whose spool is removable from the handle-mounting side.

2. Description of Related Art

Dual-bearing reels conventionally are furnished with a reel body having a handle, a spool fitted rotatively in the reel body, and a cranking mechanism that transmits handle rotation to the spool. A clutch mechanism that connects/disconnects the handle and the spool is provided in the cranking mechanism. The clutch mechanism is operated between its connected state (CLUTCH-ON state) and its disconnected state (CLUTCH-OFF state) by a clutch-operating handle.

Among this type, dual-bearing reels provided with two operating handles are known: a clutch-off operating handle for CLUTCH-OFF; and a clutch-on operating handle for CLUTCH-ON. In this sort of dual-bearing reel, the CLUTCH-OFF operating handle is provided on the rear of the reel body, and the CLUTCH-ON operating handle is provided forward of and above the clutch operating handle. The two operating handles are linked by a linking member. In the past, this sort of conventional dual-bearing reel having two operating handles has been made so that the spool is attached/removed through the side of the reel body opposite the handle-mounting side.

With the foregoing conventional configuration, in performing maintenance an the mechanisms provided on the handle-mounting side, such as the cranking mechanism and the clutch mechanism, when the side cover on the handle-mounting side is opened, the clutch-operating handles and the linking member get scattered disassembling. Maintenance work an the handle-mounting side is therefore hard to do.

SUMMARY OF THE INVENTION

An object of the present invention is to facilitate maintenance on the handle mounting side interior in a dual-bearing reel having two clutch-operating handles for performing different clutch operations.

A dual-bearing reel in terms of a first aspect of the invention mounts onto a fishing rod, is a reel that retrieves fishing line turning on a spindle along an axis that intersects the fishing rod longitudinally, and is furnished with: a reel body; a line-winding spool; a handle; a cranking mechanism; a clutch mechanism; a first clutch-operating handle: a second clutch-operating handle, a linking member; and a clutch-switching device. The reel body is what mounts onto a fishing rod, and includes; first and second side plates disposed in opposition separated by a spacing in the direction of the intersecting axis; connectors that connect the two side plates; a first side cover that attaches removably onto the first side plate for covering the first side plate outwardly; as well as a mechanism-mounting plate that attaches removably to the first side cover, where between it and the first side cover is a mechanism mounting space. The line-winding spool is fitted rotatively in the reel body, disposed between the two side plates. The handle, turning on an axis parallel with the spool rotational center axis, is rotatively fitted on the reel body, projecting from the first side cover to the exterior. The cranking mechanism, provided in the mechanism mounting space, is a mechanism for transmitting handle torque to the spool. The clutch mechanism is provided along the way in the rotation-transmitting course of the cranking mechanism, and is a device that enables switching between a transmission state in which handle rotation is transmitted to the spool, and a cutoff state that leaves the spool free to rotate. The first clutch-operating handle is a component in between the two side plates mounted so it cannot come off but is free to shift, for working the clutch mechanism to switch it from the transmission state into the cutoff state. The second clutch-operating handle is a component in between the two side plates, separated by a spacing from the first clutch-operating handle and mounted so it cannot come off but is free to shift, for working the clutch mechanism to switch it from the cutoff state into the transmission state. The linking member, provided free to shift within the mechanism mounting space, is removable with respect to the two clutch-operating handles mounted between the two side plates, and is a component that links the two clutch-operating handles cooperatively. The clutch-switching device is provided in the mechanism mounting space, and is a device that, shifting cooperatively with the movement of the linking member, switches the clutch mechanism between the transmission state and the cutoff state.

With this dual-bearing reel, when the first side cover is undone from the first side plate in order to do maintenance work, for example, the mechanism-mounting plate comes off from the first side plate together with the first side cover. Further, because the first and second clutch-operating handles are fitted between the two side plates so that they cannot come off, they remain as is between the two side plates. Still further, because the linking member is provided in the mechanism mounting space, it will not get scattered as long as the mechanism-mounting plate is not undone from the first side plate. Herein, because the two operating handles are fitted between both the side plates so that they cannot come off, and because the mechanism-mounting plate is provided to put the linking member in the mechanism mounting space, opening the first side cover on the handle-mounting side will not scatter the dissembling clutch-operating handles and linking member. Interior maintenance on the handle-mounting side is therefore easier to carry out.

A dual-bearing reel in terms of a second aspect of the invention is a reel as set forth in the first aspect, wherein the linking member has first and second interlocking portions that interlock respectively with the first clutch-operating handle and the second clutch-operating handle. In this case, the two clutch-operating handles are cooperatively linked by both the clutch-operating handles interlocking respectively with the interlocking portions.

A dual-bearing reel in terms of a third aspect of the invention is a reel as set forth in the second aspect, wherein: when the first clutch-operating handle is worked into the cutoff state, the first interlocking portion interlocks with the first clutch-operating handle and the linking member shifts, and the second interlocking portion interlocks with the second clutch-operating handle; and when the second clutch-operating handle is worked into the transmission state, the second interlocking portion interlocks with the second clutch-operating handle and the linking member shifts, and the first interlocking portion interlocks with the first clutch-operating handle and is shifted into the cutoff state. In this case, the configuration is one in which the respective interlocking portions interlock with the respective operating handles unidirectionally only, which simplifies the interlocking structure.

A dual-bearing reel in terms of a fourth aspect is a reel as set forth in any of the first through third aspects of the invention, wherein an aperture through which the spool can be passed is formed in the first side plate. In this case, the clutch-operating handles and the linking member do not disassemble by undoing the first side cover and attaching/removing the spool through the first side plate, making the job of attaching/removing the spool easier.

A dual-bearing reel in terms of a fifth aspect of the invention is a reel as set forth in the fourth aspect, wherein the mechanism mounting plate is removably attached to the first side cover by screws. In this case, the fact that the mechanism mounting plate is held fast simply by the screws means that the mechanism mounting plate can be taken off the first side plate easily.

A dual-bearing reel in terms of a sixth aspect is a reel as set forth in any of the second through fifth aspects of the invention, further provided with an attach-blocking means that blocks attachment of the first side cover when the first clutch-operating handle is an the cutoff-state end and the first interlocking portion is an the transmission-state end. In this case, when the positions of the first clutch-operating handle and the first interlocking portion do not agree, the first side cover cannot be attached to the side plate, which means therefore that they will not be assembled with the positions of the first clutch-operating handle and the linking member wrong.

A dual-bearing reel in terms of a seventh aspect of the invention is a reel as sat forth in any of the first through sixth aspects, further provided with a first urging member that urges the second clutch-operating handle into the cutoff state. In this case, because the second clutch-operating handle is always urged toward the cutoff-state end by the urging member after the operation of working the second clutch-operating handle into the transmission-state end, it is returned to the cutoff-state end. This means that the clutch can be operated with light force when the first clutch-operating handle is worked from the transmission-state into the cutoff-state end, since the second clutch-operating handle does not need to be shifted. Further, because the second clutch-operating handle always shifts into the cutoff-state end when brought out of engagement with the second interlocking portion by undoing the first side cover, when attaching the first side cover, attention need be given only to the engagement of the first interlocking portion and the first clutch-operating handle.

A dual-bearing reel in terms of an eighth aspect is a reel as sat forth in the seventh aspect of the invention, further provided with a second urging member that urges the first clutch-operating handle into the transmission state. In this case, the fact that the first clutch-operating handle moreover is also urged into the transmission state when the first side cover is undone means that the first side cover can be attached without minding about the positions of the two clutch-operating handles.

A dual-bearing reel in terms of a ninth aspect is a reel as set forth in any of the first through sixth aspects of the invention, further provided with a first urging member that urges the second clutch-operating handle into the transmission state. In this case, because the second clutch-operating handle is always urged toward the transmission-state end, the clutch can be operated with light force when working the second clutch-operating handle from the cutoff stats into the transmission-state end. Further, because the second clutch-operating handle always shifts into the transmission-state end when brought out of engagement with the second interlocking portion by undoing the first side cover, when attaching the first side cover, attention need be given only to the engagement of the first interlocking portion and the first clutch-operating handle. This facilitates attaching the first side cover.

A dual-bearing reel in terms of a tenth aspect of the invention is a reel as set forth in any of the first through ninth aspects of the invention, further provided with a clutch restoring mechanism that, when the clutch mechanism is in the cutoff state, restores the clutch mechanism to the transmission state in cooperation with rotation of the handle in the line-retrieving direction. In this case, the clutch may be switched into the transmission state not only by operating the second clutch-operating handle, but also by operating the reel handle in the line-retrieving direction.

From the following detailed description in conjunction with the accompanying drawings, the foregoing and other objects, features, aspects and advantages of the present invention will become readily apparent to those skilled in the art.

BRIEF DESCRIPTION OF THE DRAWINGS

FIG. 4 is a view of the FIG. 1 reel from a right-lateral aspect with the side cover undone, during CLUTCH-ON;

DETAILED DESCRIPTION OF THE PREFERRED EMBODIMENTS

First Embodiment

Figure 1:
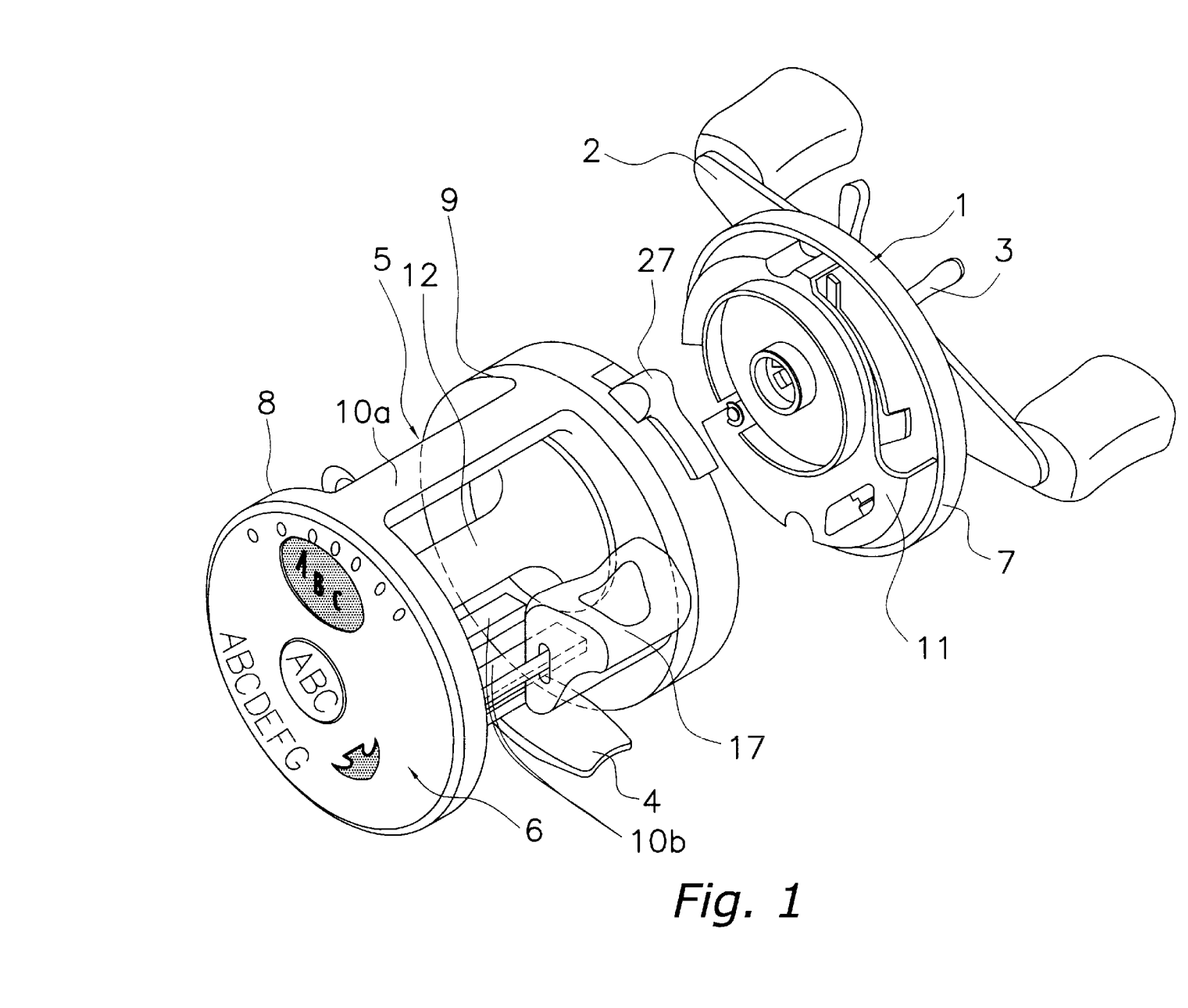
FIG. 1 is an oblique view of the handle reverse-side disassembled from a dual-bearing reel in which one embodiment of the present invention is adopted.
Figure 2:
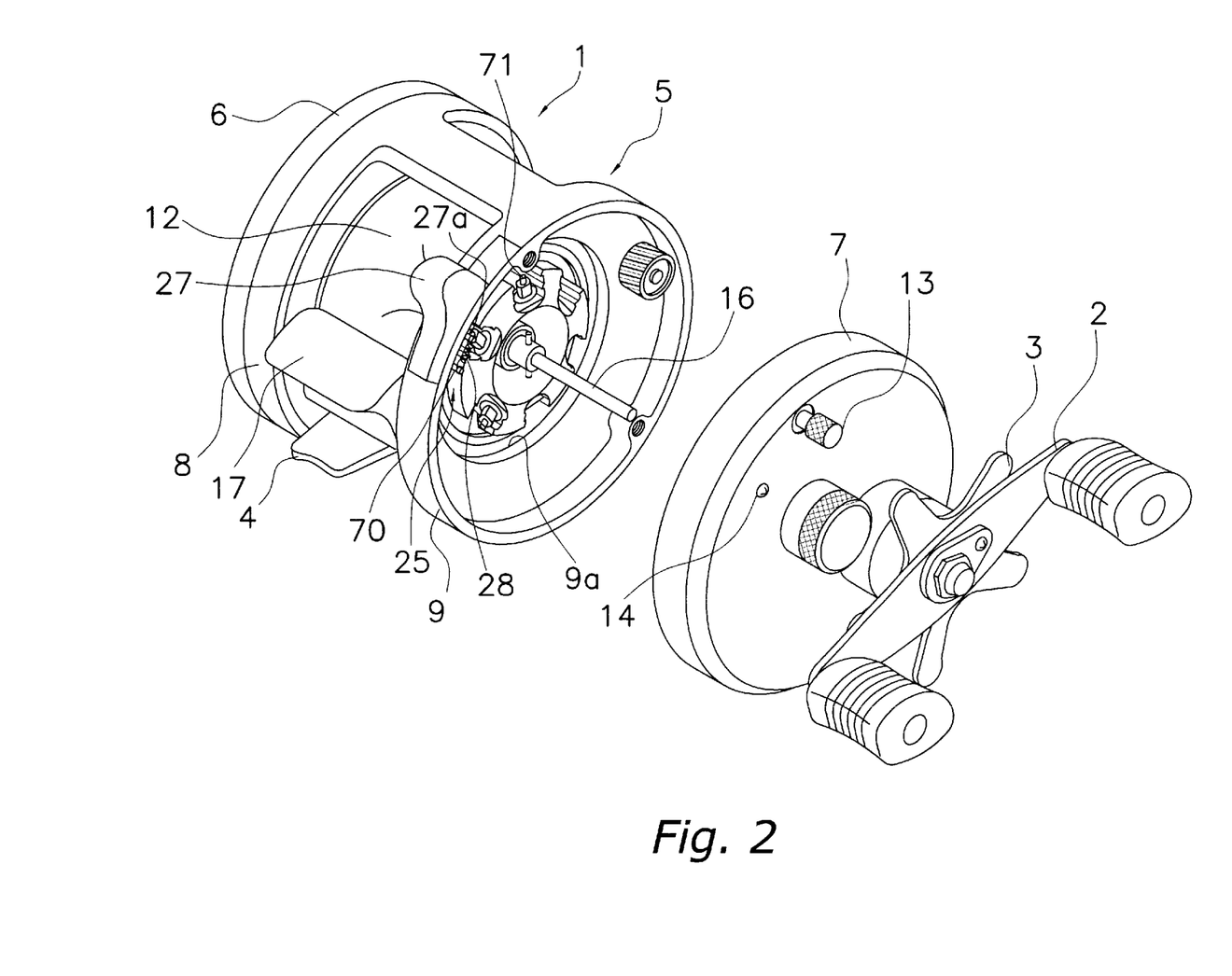
FIG. 2 is an oblique view of the handle side disassembled from the FIG. 1 dual-bearing reel.
Figure 3:
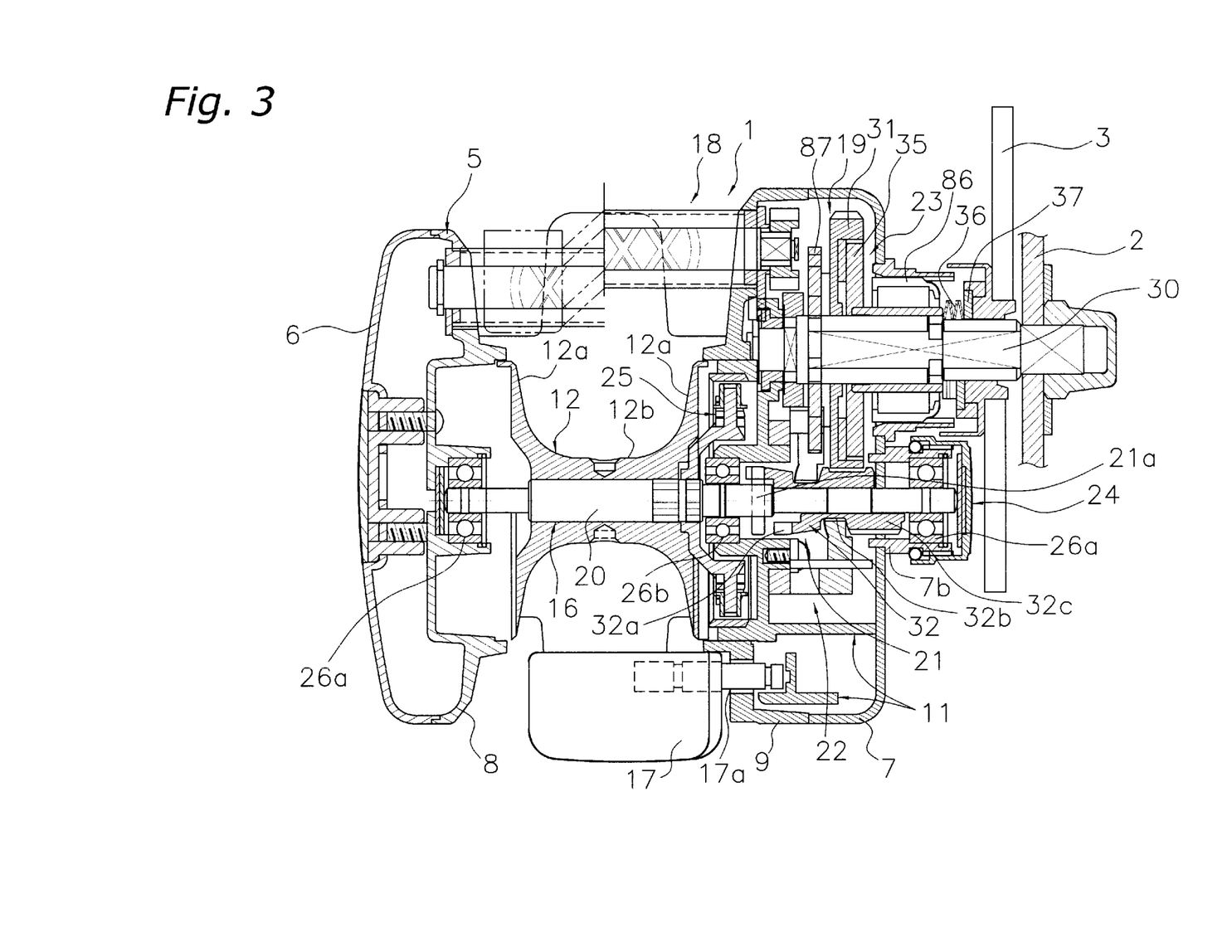
FIG. 3 is a vertical section view of the FIG. 1 reel.

Reference is made to FIGS. 1 through 3, which depict a round baitcasting reel as a dual-bearing reel according to one embodiment of the present invention. The reel is furnished with a reel body 1; a handle 2, disposed sideways on the reel body 1 for spool rotation; and a star drag 3 for drag adjustment, disposed on the handle 2 side of the reel body 1.

Reel Body Configuration

The reel body 1, a component made of aluminum alloy, includes a frame 5; a pair of side covers 6, 7 removably fastened onto either side of the frame 5; and a mechanism mounting plate 11 removably fastened to the side cover 7. A line-winding spool 12, rotative via a spool shaft 16, is removably fitted into the interior of the reel body 1.

The frame 5 includes a pair of side plates 8, 9 disposed to oppose mutually parted by a predetermined spacing, and upper and lower connectors 10a, 10b that unitarily connect the side plates 8, 9. The side plates 8, 9 seen from the spool axial direction are round, tubular components having an interior space closed by a flat end. A round aperture 9a for attaching/removing the spool 12 is formed somewhat above the control of the side plate 9 (first side plate). A rod-mounting leg 4 for attaching the reel to a fishing rod is formed unitarily with the underside of the connector 10b.

As shown in FIG. 3, the spool 12, a first clutch-operating handle 17 that serves as a thumb-rest when "feathering," and a level-wind mechanism 18 for winding fishing line uniformly into the spool are disposed in between the side plates 8, 9 on the frame 5. A second clutch-operating handle 27 is mounted on the side plate 9. Further, disposed in between the frame 5 and the side cover 7 are: a cranking mechanism 19 for transmitting torque from the handle 2 to the spool 12 and the level-wind mechanism 18; a clutch mechanism 21; a clutch-switching device 22 for controlling the clutch mechanism 21 in response to operation of the clutch-operating handle 17; a drag mechanism 23 that controls the spool 12; a casting control mechanism 24 for adjusting resistive force on the spool 12 during its rotation; and a centrifugal braking mechanism 25 for suppressing backlash during casting.

The side cover 6 is made of metal, formed by press working into a tubular component closed by a flat end curving convexly slightly outward. The side cover 7 (first side cover) is also a tubular, flat-ended, press-formed article, made, for example, of aluminum alloy. The side cover 7 is removably fastened to the side plate 9 on the frame 5 by two screws 13 (only one is illustrated in FIG. 2). The heads of the screws 13 are for being turned by hand. The side cover 7 is therefore readily attached/removed without using a screwdriver or other tool.

Mechanisms including the clutch-switching device 22 and the cranking mechanism 19 are mounted on the mechanism mounting plate 11. The mechanism mounting plate 11 is provided so that the mechanisms mounted within it may be attached/removed unitarily with the side cover 7. The mechanism mounting plate 11 is removably fastened to the side cover 7 by a screw 14. The screw 14 is for example a round-headed machine screw, meaning that it is turned with a tool. The mechanism mounting plate 11 is disposed contacting the outside face of the side plate 9.

Spool and Spool shaft Configuration

As shown in FIG. 3, the spool 12 has a saucer-shaped flange 12a on both sides, and has a tubular bobbin trunk 12b in between the two flanges 12a. By means of, for example, a serrated coupling, the spool 12 is fastened non-rotatably to a spool shaft 16 penetrating the bobbin trunk 12b. This fastening method is not limited to a serrated coupling; various coupling methods such as key coupling or spline coupling can be employed.

Figure 4:
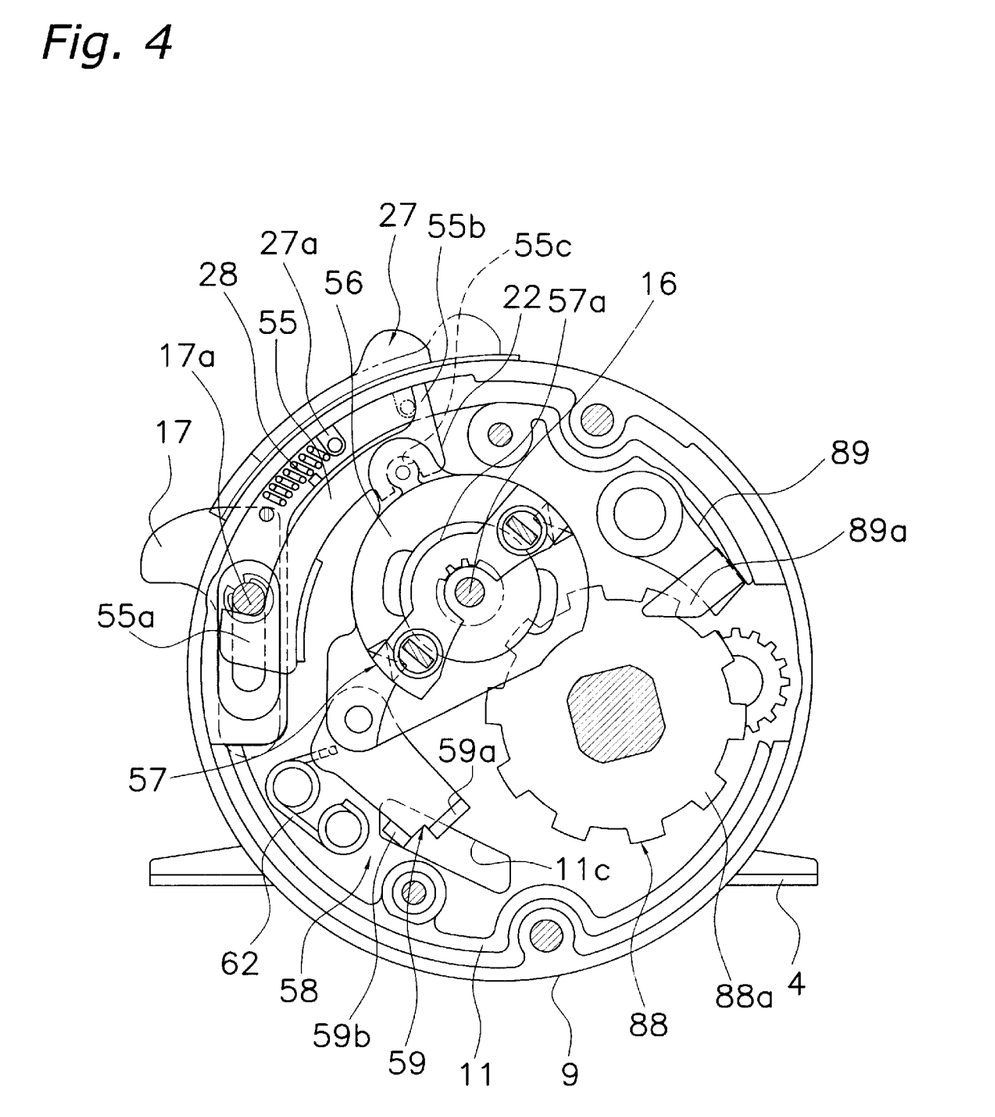
Figure 6:
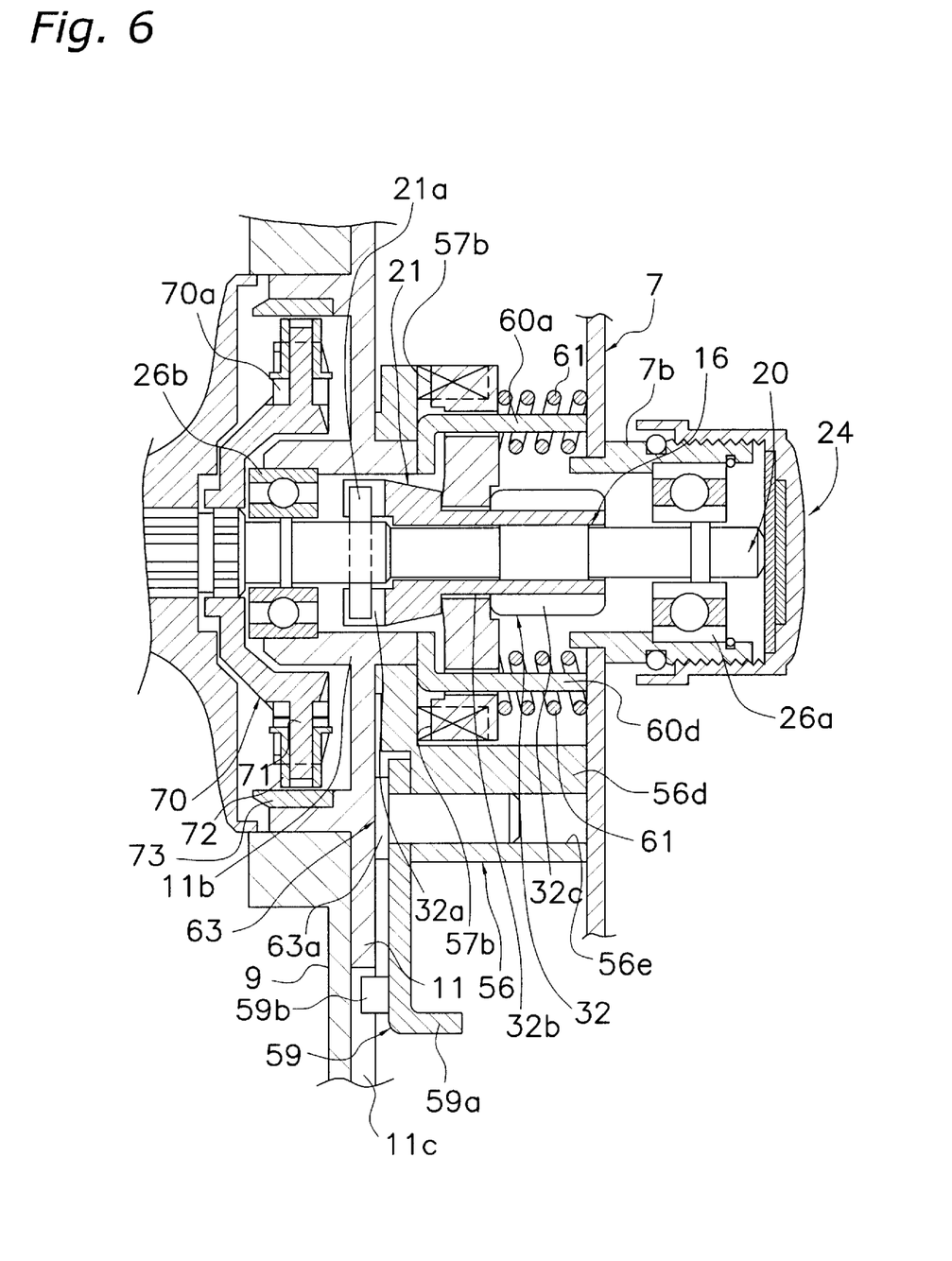
FIG. 6 is a fragmentary section view enlarged from FIG. 3, showing details of a clutch-switching device.
Figure 7:
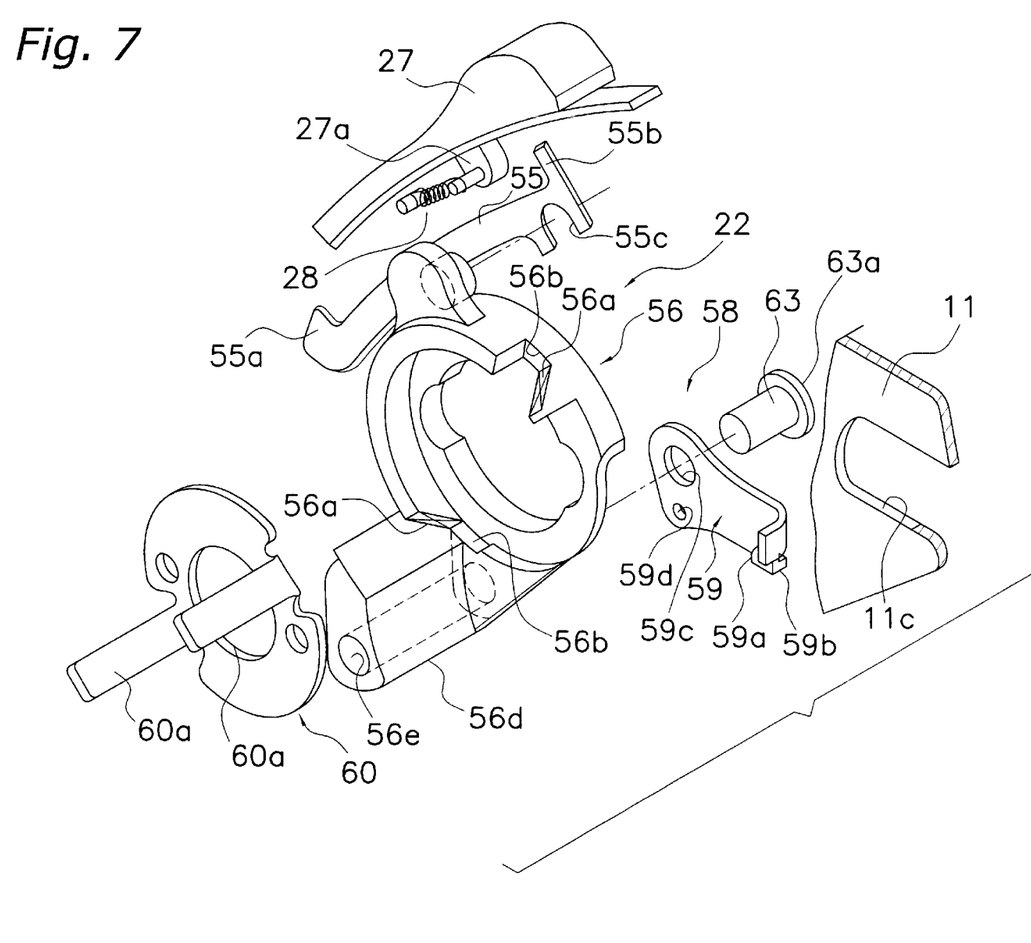
FIG. 7 is an exploded oblique view of the clutch-switching device removed from the FIG. 1 reel.

The spool shaft 16, as shown in FIGS. 3 and 4, penetrates the side plate 9 and extends outward of the side cover 7. A pair of ball bearings 26a, 26a support the spool shaft 16. The one end of the spool shaft 16 penetrating the side plate 9 projects outward through a boss 7b fastened to the side cover 7, The FIG. 3 right-side ball bearing 26a is fitted into the bass 7b, and the left-side ball bearing is fitted into the side plate 8. An intermediate ball bearing 26b is fitted, as shown in FIG. 6, into a boss 11b formed on the mechanism mounting plate 11.

An engagement pin 21a that is a component of the clutch mechanism 21 is fixed to the FIG. 3 rightward, spool 12 mounting portion of the spool shaft 16. The engagement pin 21a penetrates the spool shaft 16 along the diameter, with its either end projecting diametrically.

The first clutch-operating handle 17, as shown in FIG. 3, is disposed behind the spool 12, rearward between the pair of side plates 8, 9. The clutch-operating handle 17, for operating the clutch mechanism 21 to switch it from the CLUTCH-ON state to the CLUTCH-OFF state, is fitted between the side plates 8, 9 so that it cannot come off, but is free to slide in the up-and-down direction. An engagement spindle 17a that penetrates the side cover 9 is formed by insert molding unitarily with the clutch-operating handle 17 on the handle-mounting side. The engagement spindle 17a engages with the clutch-switching device 22.

The second clutch-operating handle 27 is provided for operating the clutch mechanism 21 to switch it from the CLUTCH-OFF state to the CLUTCH-ON state. The second clutch-operating handle 27 is fitted on the outer circumferential surface of the side plate 9 so that it cannot come off but is free to shift circumferentially. The second clutch-operating handle 27 has an interlock-tongue 27a that penetrates a slit (not illustrated) formed in the outer circumferential surface of the side plate 9 and extends inward; and a coil spring 28, one end of which is interlocked with the side plate 9, and the other end of which is interlocked with the interlock-tongue 27a, urges the second clutch-operating handle 27 toward the clutch cutoff end.

Cranking Mechanism Configuration

The clutch cranking mechanism includes a handle shaft 30, a master gear 31 fitted on the handle shaft 30, and a tubular pinion gear 32 that meshes with the master gear 31. The handle shaft 30 is mounted rotatively in the side plate 9 and side cover 7, and prohibited from rotating in the line reel-out direction (reversing) by means of a roller-type one-way clutch 86 and a ratchet-type one-way clutch 87.

The one-way clutch 87 has, as shown in FIG. 4, a ratchet wheel 88 fitted non-rotatably to the handle shaft 30, and a ratchet pawl 89 fitted pivotally to the mechanism mounting plate 11. Ratchet teeth 88a, formed projecting in approximate parallelograms, are disposed circumferentially spaced on the outer periphery of the ratchet wheel 88; and by meshing with a ratchet tooth 88a, the ratchet pawl 89 prohibits rotation of the handle shaft 30 in the line reel-out direction. On its tip and the ratchet pawl 89 has control flaps 89a that sandwich the ratchet wheel 88 on either side. During rotation in the line-retrieving direction, the control flaps 89a part the ratchet pawl 89 away from, and during rotation in the line reel-out direction contact it on, the ratchet wheel 88.

The master gear 31, as shown in FIG. 3, is mounted rotatively on the handle shaft 30, and is linked via the drag mechanism 23 to the handle shaft 30. The drag mechanism 23 includes the star drag 3, a drag plate 35 for varying the pressure-contacting force by the star drag 3 on the master gear 31, regulating Belleville washers 36 disposed in between the star drag 3 and the one-way clutch 86, and a drag spacer 37 sandwiched between the Belleville washers 36 and the star drag 3. The outer periphery of the drag spacer 37, a washer-shaped component made of molybdenum-impregnated nylon, engages and is inserted into the star drag 3. The inner diameter of the hole-forming inner periphery is greater than the outer diameter of the handle shaft 30.

The pinion gear 32, a tubular component that the spool shaft 16 penetrates, as shown in FIG. 6 extends inward from the exterior of the side plate 9, and is fitted to the spool shaft 16 rotatively and free to shift axially. A meshing groove 35a into which the engagement pin 21a meshes is formed on the left end of the pinion gear 32. The meshing groove 32a and the engagement pin 21a compose the clutch mechanism 21. In the mid portion of the pinion gear 32 a constriction 32b, and on the right end a gear 32c that meshes with the master gear 31, are respectively formed.

Clutch-Switching Device Configuration

The clutch-switching device 22 includes, as shown in FIGS. 4 through 7: a clutch plate (one example of a linking member) 55 that engages with the engagement spindle 17a; a clutch cam 56 that engages with the clutch plate 55 and turns centered on the spool shaft 16; and a clutch yoke 57 that by means of the clutch cam 56 shifts along the spool shaft 16 direction. The clutch-switching device 22 also has a clutch return mechanism 58 that, in cooperation with rotation of the spool 12 in the line-retrieving direction, returns to the CLUTCH-ON state a clutch mechanism 21 in the CLUTCH-OFF state.

The clutch plate 55, a sectorially formed plate-shaped component made of metal, is guided in the rotational direction by a guide (not illustrated) formed on the mechanism mounting plate 11. A first interlocking portion 55a is formed at one end of the clutch plate 55. The first interlocking portion 55a extends into a location for contacting the underside of the engagement spindle 17a on the first clutch-operating handle 17, so as to shift the clutch plate 55 FIG. 4 counterclockwise in cooperation with the first clutch-operating handle 17 shifting downward. When the clutch plate 55 is in the CLUTCH-ON position shown in FIG. 4, and the first clutch-operating handle 17 is in the CLUTCH-OFF position shown in FIG. 5—i.e., when the positional relationship between the clutch plate 55 and the first clutch-operating handle 17 is wrong—the first interlocking portion 55a rides up on the first engagement spindle 17a. When attempting to attach the side cover 7 in this situation, the side cover 7 therefore ends up lifting off the side plate 9. Accordingly, the side cover 7 is blocked from being attached when the clutch plate 55 and the first clutch-operating handle 17 are not in their proper positional relationship.

A second interlocking portion 55b is formed at the other end of the clutch plate 55. The second interlocking portion 55b extends diametrically outward into a location enabling contact with the FIG. 4 right surface of the interlock-tongue 27a on the second clutch-operating handle 27. Furthermore, a third U-shaped interlocking portion 55C (FIG. 7) that interlocks with the clutch cam 56 is formed on the inside toward this other end. The clutch plate 55, turning on the spool shaft 16, rotates in cooperation with the clutch cam 56: meanwhile, in cooperation with a downward operation of the first clutch-operating handle 17, it rotates into the CLUTCH-OFF state, and in response to movement of the second clutch-operating handle 27 FIG. 4 clockwise, it rotates into the CLUTCH-ON state.

The clutch cam 56—an approximately ring-shaped component made of a synthetic resin, e.g., a polyacetyl resin—is rotatively fitted, turning on the spool shaft 16, to the outer circumferential surface of the boss 11b formed on the mechanism mounting plate 11. The clutch cam 56 is retained by a check plate 60 screwed fast to the tip end of the boss 11b. A pair of guides 60a, 60a for guiding the clutch yoke 57 in the spool axial direction is formed on the check plate 60 by folding.

A pair of slant cams 56a, 56a is formed on the outside surface of the clutch cam 56 in opposing positions astride the spool shaft 16. Further, recesses 56b, 56b that house slant cams 57b, 57b (later described) on the clutch yoke are formed adjoining the slant cams 56a, 56a. a engagement pin 56c that engages with the third interlocking portion 55c on the clutch plate 55 is formed on the outer periphery of the clutch cam 56. Furthermore, a projection 56d is formed on the outer periphery of the clutch cam 56, and a returning member 59 that forms a component of the clutch return mechanism 58 is mounted pivotally on the mechanism mounting plate 11 side of the projection 56d. As shown in FIG. 6, the projection 56d is of thickness that fills the gap between the mechanism mounting plate 11 and the side cover 7. A coupling hole 56c through which a coupling pin 63 is insertable is formed parallel to the spool axis in the projection 56d.

By thus providing the projection 56d at thickness that fills the gap, and sandwiching the returning member 59 between the projection 56d and the mechanism mounting plate 11, the clutch cam 56 is not likely to deform, and the returning member 59 is not likely to lift off, even though a load acts on the returning member 59.

The coupling pin 63, a component manufactured from a synthetic resin such as polyacetyl resin mixed with glass fibers, is a brim 63a capped pin that couples pivotally with the returning member 59. The brim 63a 63 is disposed sandwiched between the mechanism mounting plate 11 and the returning member 59, and thereby the coupling pin 63 is retained.

The clutch yoke 57 is disposed in axially outward opposition to the clutch cam 56. The two guides 60a, 60a, which are stood astride the spool shaft 16 between the mechanism mounting plate 11 and the side cover 7 guide the clutch yoke 57, which is free to shift in the spool shaft 16 direction. Further, coil springs 61, disposed in a compressed state circumferentially about the guides 60a, 60a in between the side cover 7 and the clutch yoke 57 urge axially inward (FIG. 6 leftward).

The clutch yoke 57 is formed with a semispherical arcuate engagement portion 57a that engages with the constriction 32b on the pinion gear 32. Slant cams 57b, 57b that ride on the slant cams 56a, 56a are formed on the lateral face of the clutch yoke 57 that opposes the clutch cam 56. When the clutch cam 56 rotates FIG. 4 counterclockwise and the slant cams 57b, 57b ride up on the slant cams 56a, 56a, the clutch yoke 57 shifts FIG. 6 rightward to the CLUTCH-OFF position; again, it returns to the CLUTCH-ON position urged by the coil springs 61 when the slant cams 57b, 57b come down from the slant cams 56a, 56a. The pinion gear 32 shifts in the axial direction of the spool in cooperation with the movement of the clutch yoke 57, which switches the clutch mechanism 21 between the CLUTCH-OFF state and the CLUTCH-ON state.

The clutch return mechanism 58 includes: the ratchet wheel 88, which rotates cooperatively with the handle 2; the clutch cam 56, which rotates cooperatively with the clutch-operating handle 17; the returning member 59, which is pivotally coupled to the clutch cam 56; the coupling pin 63, which pivotally couples the returning member 59 and the clutch cam 56; and a toggle spring 62 that urges the returning member 59. The returning member 59, a plate-shaped component made of metal such as stainless alloy, is coupled pivotally to the clutch cam 56 by the coupling pin 63. Rotation of the clutch cam 56 shifts the returning member 59 between an engagement position (FIG. 5) in which it contacts the ratchet teeth 88a on the ratchet wheel 88, and a separated position (FIG. 4) in which it is parted away therefrom. An engagement pawl 59a that comes into contact with the ratchet teeth 88a, and a guiding pawl 59b that is guided in a slender guide groove 11c formed in the mechanism mounting plate 11, are formed on the tip of the returning member 59 by folding. Formed in the basal end thereof are a coupling hole 59c through which the returning member 59 is pivotally coupled to the clutch cam 56 by the coupling pin 63, and an interlocking hole 59d for interlocking the toggle spring 62.

One end of the coil spring is interlocked with the returning member 59, and the other end is made up of a torsion coil spring rotatively interlocked with the mechanism mounting plate 11. The toggle spring 62 toggling urges the returning member 59 into two positions, an engaged position and a disengaged position, and holds the returning member in either position. Via the return member 59, the toggle spring 62 also holds the clutch cam 56 in the CLUTCH-ON position and the CLUTCH-OFF position.

Figure 5:
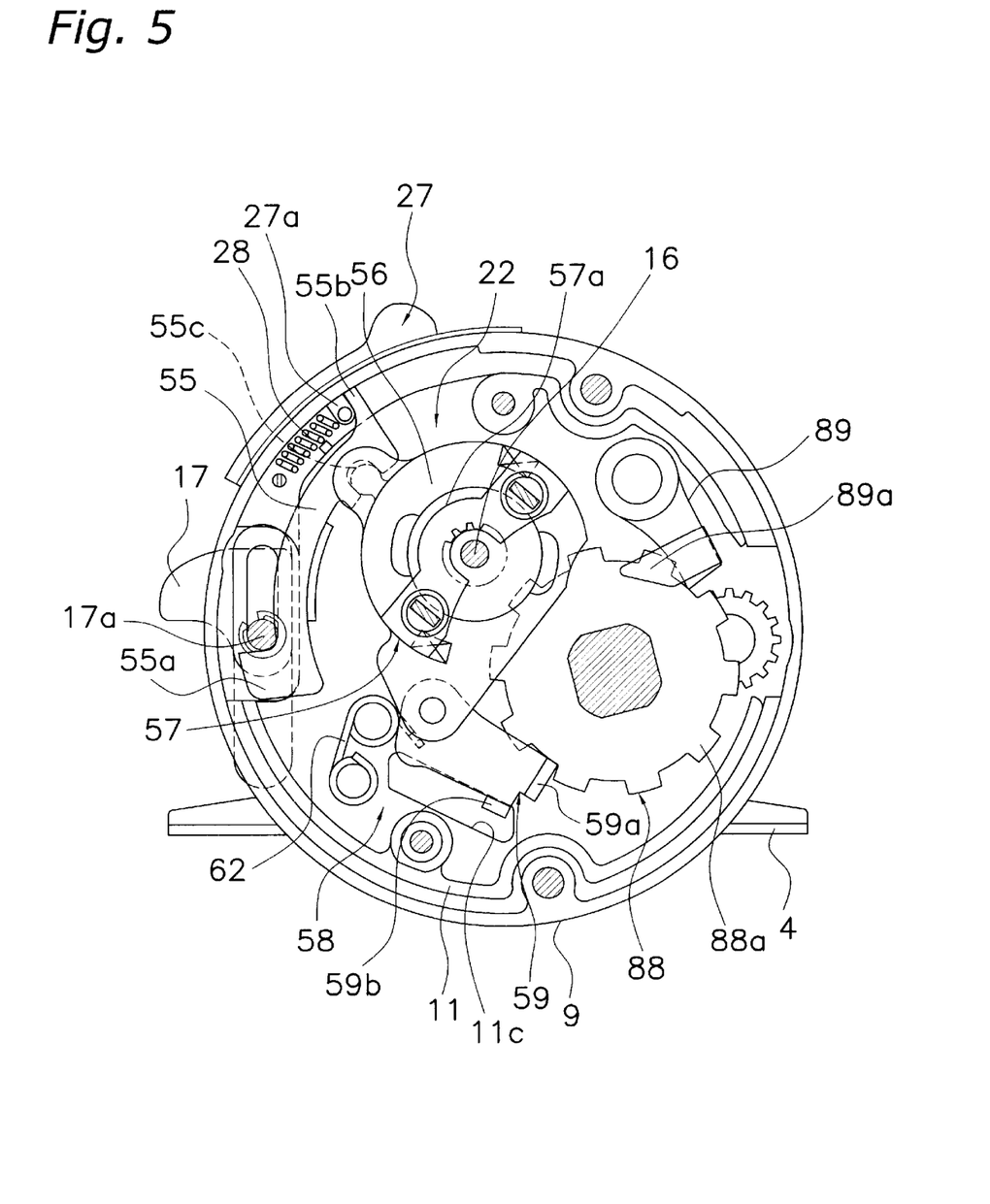
FIG. 5 is a view corresponding to FIG. 4, during CLUTCH-OFF.

In the clutch return mechanism 58, when the clutch mechanism 21 is worked into the CLUTCH-OFF state by pressing the clutch-operating handle 17, the clutch cam 56 rotates counterclockwise, and the returning member 59 advances from the disengaged position shown in FIG. 4 to the engaged position shown in FIG. 5, in which it contacts a ratchet tooth 88a. In this situation, the guiding pawl 59b is guided on the outside rim of the guide groove 11e against the urging force of the toggle spring 62 and the returning member 59 advances toward the ratchet wheel 88, until the toggle spring 62 goes beyond dead center; beyond dead center, the returning member 59 rotates counterclockwise and, guided on the inside rim of the guide groove 11c, shifts into the engaged position.

In the state in which the returning member 59 is in the engaged position, when the handle shaft 30 under operation of the handle 2 rotates in the line-retrieving direction, the engagement pawl 59a on the returning member 59 is pressed by the ratchet wheel 88a and returns to the disengaged position. At the same time therewith, the clutch cam 56 rotates FIG. 5 clockwise, returning the clutch mechanism 21 to the CLUTCH-ON state.

Centrifugal Braking Mechanism Configuration

The centrifugal braking mechanism 25, as shown in FIG. 6, includes; a brake installation platform 70 mounted non-rotatably to the spool shaft 16; six guide pins 71 stood radially on the brake installation platform 70; six braking collars 72, fitted free to shift on the respective guide pins 71; and a brake pipe 73, disposed to the outer peripheral side of the braking collars 72.

In six places circularly along the brake installation platform 70, a thick round plate-shaped component made of synthetic resin, recesses 70a for accommodating the braking collars 72 are formed. The radially stood guide pins 71 are formed unitarily into the recesses 70a.

Dual-Bearing Reel Operation

When casting is to take place, the clutch-operating handle 17 is pressed downward. The engagement spindle 17a thus presses on the interlocking portion 55a, which shifts the clutch plate 55 FIG. 4 counterclockwise. When the clutch plate 55 rotates, cooperatively therewith tho clutch cam 56 rotates counterclockwise and is disposed in the CLUTCH-OFF position shown in FIG. 5. Further, the clutch yoke 57 shifts FIG. 6 rightward into the CLUTCH-OFF position. Further still, the second interlocking portion 55b comes into contact with the interlock-tongue 27a on the second clutch-operating handle 27. Consequently, the pinion gear 32 that is a component of the clutch mechanism 21 shifts axially outward, into the CLUTCH-OFF state. In the CLUTCH-OFF state, the spool 12 is put into its freely rotational state, and when a cast is made, the fishing line reels out vigorously from the spool 12 under the weight of the terminal tackle.

When the terminal tackle lands in the water, the second clutch-operating handle 27 is pressed forward. The interlock-tongue 27a thus presses on the second interlocking portion 55b, rotating the clutch plate 55 FIG. 4 clockwise. When the clutch plate 55 rotates clockwise, the clutch cam 56 rotates in the same direction, and the clutch yoke 57 shifts under the urging force of the coil spring 61 into the CLUTCH-ON position, putting the clutch mechanism 21 into the CLUTCH-ON state. Handle 2 rotation is thereby transmitted to the spool 12, rotating the spool 12 in the line-retrieving direction.

Meanwhile, though the handle 2 is rotated in the line-retrieving direction, the clutch state is ON. When the handle 2 is rotated in the line-retrieving direction, the ratchet wheel 88 rotates in the line-retrieving direction (FIG. 5 clockwise), and the ratchet pawl 89 pivots outward of the ratchet wheel 88 due to the action of the control flaps 89a. Consequently, during line retrieval, the ratchet pawl 89 comes out of contact with the ratchet wheel 88, and the clicking sound due to the contact between the two is no longer produced during line retrieval. Further, when the ratchet wheel 88 rotates in the line-retrieving direction, the ratchet teeth 88a abut on the engagement pawl 59a on the tip of the returning member 59, pressing the returning member 59 rearward. When this happens, the returning member 59 goes beyond dead center of the toggle spring 62 and retreats, urged by the toggle spring 62 into the disengaged position. Cooperatively with this movement, the clutch cam 56 rotates FIG. 5 clockwise, the clutch yoke 57 shifts into the CLUTCH-ON position under the urging force of the coil spring 61, and the clutch mechanism 21 is put into the CLUTCH-ON state. Handle 2 rotation is thereby transmitted to the spool 12, rotating the spool 12 in the line-retrieving direction.

When the handle shaft 30 rotates in the line-retrieving direction, the rotation is transmitted to the level wind mechanism 18, whereby fishing line is wound uniformly onto the spool 12.

When the spool 12 is to be taken out, the two screws 13 are undone. The side cover 7 is then taken oft the side plate 9 on the frame 5. Therein, that fact that the mechanism mounting plate 11 is fixed to the side cover 7 means that the cranking mechanism 19 and the clutch-switching device 22 will not become scattered. In this state the spool 12 can be taken out through the aperture 9a in the side plate 9. Further, adjustment of the shifting member braking force in the centrifugal braking mechanism 25 is enabled.

In this embodiment, the fact that the two clutch-operating handles 17, 27 are mounted on the side plate 9 so that they cannot come off, and that the clutch plate 55 is established within the mechanism mounting space by providing the mechanism plate 11, means that though the side cover 7 on the handle-mounting side is opened, the clutch-operating handles 17, 27 and the clutch plate 55 will not scatteredly disassemble. This makes interior maintenance on the handle-mounting side easy to carry out, Second Embodiment In the foregoing first embodiment, a round dual-bearing reel was explained as an example, but the present invention is applicable to a low-profile, non-round dual-bearing reel.

Figure 8:
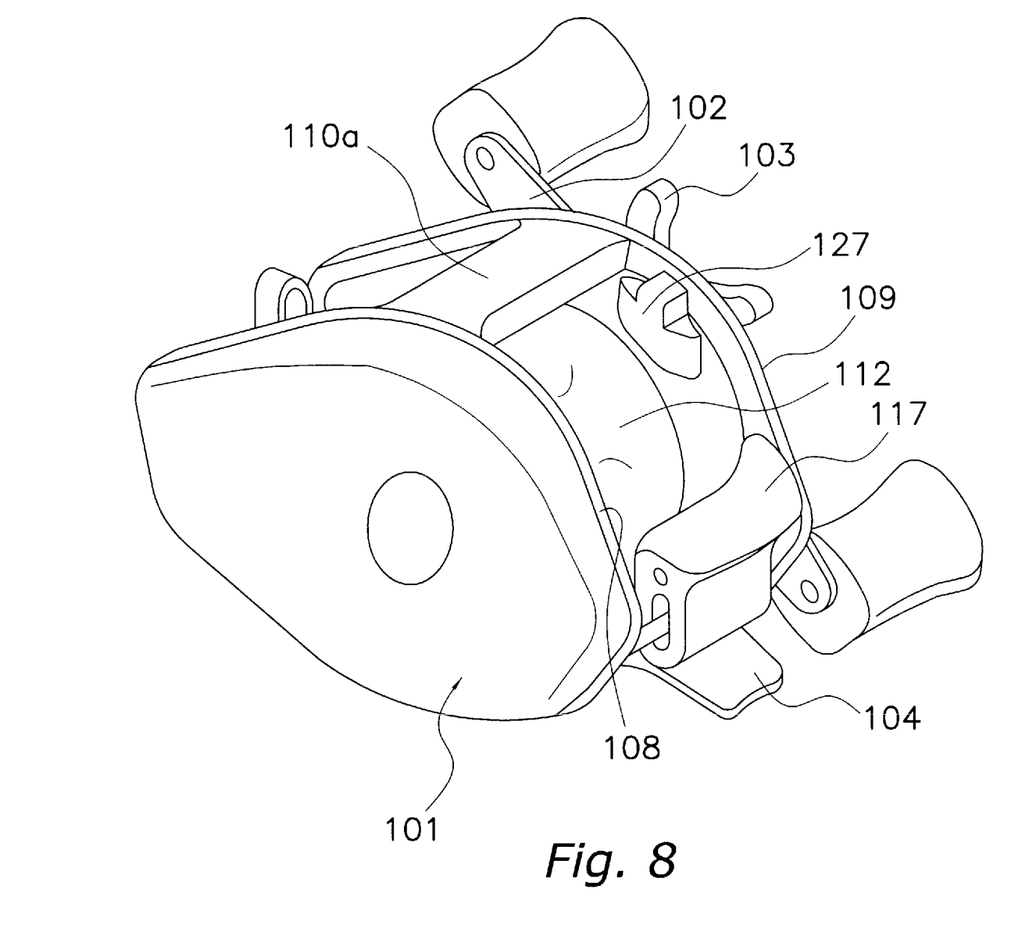
FIG. 8 is a view corresponding to FIG. 1, of another embodiment.
Figure 9:
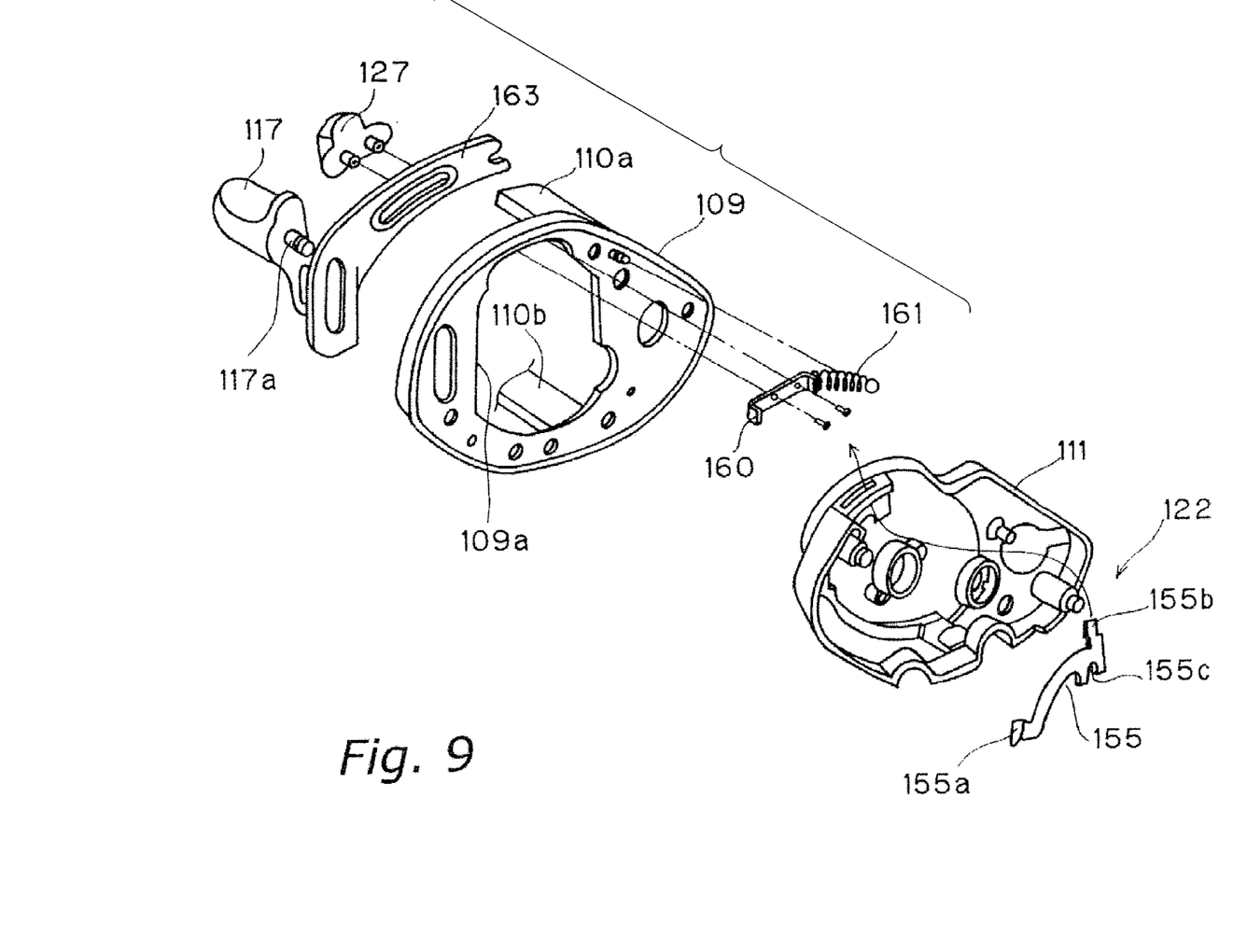
FIG. 9 is a partially exploded oblique view of components of a clutch-switching device removed from the reel of the other embodiment.

In FIGS. 8 and 9, a dual-bearing reel according to the second embodiment is furnished with: a reel body 101, a spool-rotating handle 102 disposed sideways on the reel body 101, and a drag-adjusting star drag 103 disposed on the handle 102 side of the reel body 101.

The reel body 101, a synthetic resin component, includes a frame 105, a first side cover 106 and a second side cover (not illustrated) removably fastened to the frame 105 on either side, and a mechanism mounting plate 111 removably fastened to the second side cover. A line-winding spool 112 is removably fitted into, and let rotate in, the interior of the reel body 101.

The frame 105 includes a pair of side plates 108, 109 disposed to oppose mutually parted by a predetermined spacing, and upper and lower connectors 110a, 110b that unitarily connect the side plates 108, 109. The side plates 108, 109 are components having interior space. An aperture 109a for attaching/removing the spool 112 is formed somewhat above the center of the side plate 109. A rod-mounting leg 104 for attaching the reel to a fishing rod is fixed by riveting to the underside of the connector 110b.

Excepting the clutch-switching device 122, explanation of the other mechanisms is omitted because they are like the first embodiment in configuration.

On the rear of the reel body 101, the first clutch-operating handle 117 is mounted to let it shift up and down, but so that it cannot come off. On the inside face of the side plate 109, the second clutch-operating handle 127 is mounted to let it shift back and forth, but so that it cannot come off. The first clutch-operating handle 117 has an engagement spindle 117a, and a first engagement portion 155a formed on a clutch plate 155 interlocks with the engagement spindle 117a. A coil spring 161 urges the second clutch-operating handle 127 in the CLUTCH-ON direction. By means of a stop plate 160 the second clutch-operating handle 127 is mounted letting it shift back and forth on a guide plate 163 attached to the side plate 109. The coil spring 161 is interlocked with the stop plate 160. Further, the stop plate 160 is interlocked with a second interlocking portion 155b on the clutch plate 155. Both the fore and hind ends of the stop plate 160 are folded, and it is the edge on the fore end that interlocks with the coil spring 161, and the fore surface of the edge on the hind end that interlocks with the second interlocking portion 155b. Explanation of the configuration of the rest of the clutch-switching device 122 is omitted since it is like the foregoing embodiment.

In a thus configured dual-bearing reel, pressing the first clutch-operating handle 117 downward turns the clutch plate 155 FIG. 9 counterclockwise, putting it in the CLUTCH-OFF state. When this happens, the second clutch-operating handle 127 shifts by virtue of the second interlocking portion 155b into the CLUTCH-OFF position. Again, when the second clutch-operating handle 127 is pressed forward from the CLUTCH-OFF position, the second interlocking portion 155b is pressed, which turns the clutch plate 155 into the CLUTCH-ON position, putting it in the CLUTCH-ON state. In addition, the first interlocking portion 155a presses the first clutch-operating handle 117, raising it into the CLUTCH-ON position.

Results likewise as with the foregoing embodiment can be had with a dual-bearing reel configured this way.

Other Embodiments (a) In the foregoing embodiments, the clutch cam is rotated turning on the spool shaft, but the present invention is applicable to dual-bearing reels having a clutch-switching device of the type that, shifting in the spool-shaft diametric direction, contacts/parts from the spool shaft.

(b) In the foregoing embodiments, dual-bearing reels without counters were explained as examples, but the present invention is applicable to dual-bearing reels that come with counters.

(c) The second clutch-operating handle 27 is urged unidirectionally in the two foregoing embodiments, but additionally the invention may be embodied to urge the first clutch-operating handle 17 in a direction different from the second clutch-operating handle 27. Urging the first clutch-operating handle 17 in this way eliminates need to mind about the positions of the two clutch-operating handles 17, 27 when attaching the side cover 7 to the side plate 9, which facilitates attachment of the side cover 7.

(d) Both the clutch-operating handles and both the interlocking portions interlock unidirectionally only in the way the two foregoing embodiments are configured, but they may be configured such that the interlocking portion on the one hand interlocks bi-directionally with respect to the clutch-operating handle on the one hand. In this case, since the configuration is such that attachment when out of the proper positional relationship is further blocked, attaching the side cover is further facilitated.

Since by the present invention the two clutch-operating handles are mounted on the side plate so that they cannot come off, and since the linking member is established within the mechanism mounting space by providing the mechanism plate, though the first side cover on the handle-mounting side is opened, the clutch-operating handles and the linking member will not scatteredly disassemble. This makes interior maintenance on the handle-mounting side easy to carry out.

While only selected embodiments have been chosen to illustrate the present invention, to those skilled In the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A dual-bearing reel that mounts onto a fishing rod and that for retrieving fishing line turns on a spindle along an axis intersecting the fishing rod longitudinally, the dual-bearing reel comprising:

a reel body that attaches onto the fishing rod, said reel body including first and second side plates disposed in opposition separated by a spacing in the intersecting axis direction, connectors connecting said two side plates, a first side cover removably attachable onto said first side plate for covering said first side plate outwardly, and a mechanism-mounting plate removably attachable to said first side cover, wherein a mechanism mounting space is defined between said mechanism mounting plate and said first side cover;

a line-winding spool fitted rotatively in the reel body, disposed between said two side plates;

a handle turning on an axis parallel with the spool rotational center axis, rotatively fitted on the reel body and projecting exteriorly from said first side cover;

a cranking mechanism provided in the mechanism mounting space, for transmitting torque via a rotation-transmitting course from said handle to said spool;

a clutch mechanism provided along the way in the rotation-transmitting course of said cranking mechanism, and enabling switching between a transmission state in which rotation of said handle is transmitted to said spool, and a cutoff state leaving said spool free to rotate;

a first clutch-operating handle mounted in between said two side plates and therein retained on said reel body against coming off but free to shift, for working said clutch mechanism to switch it from the transmission state into the cutoff state;

a second clutch-operating handle separated by a spacing from said first clutch-operating handle, mounted on said first side plate and therein retained on said reel body against coming off but free to shift, for working the clutch mechanism to switch it from the cutoff state into the transmission state;

a linking member provided free to shift within the mechanism mounting space, removable with respect to the two clutch-operating handles mounted between the two side plates, and linking the two clutch-operating handles cooperatively; and a clutch-switching device provided in the mechanism mounting space, for shifting cooperatively with movement of said linking member to switch said clutch mechanism between the transmission state and the cutoff state.

2. The dual-bearing reel set forth in claim 1, wherein said linking member has first and second interlocking portions for interlocking respectively with said first clutch-operating handle and said second clutch-operating handle.

3. The dual-bearing reel set forth in claim 2, wherein:

when said first clutch-operating handle is worked into the cutoff state, said first interlocking portion interlocks with said first clutch-operating handle and said linking member shifts, and said second interlocking portion interlocks with said second clutch-operating handle; and when said second clutch-operating handle is worked into the transmission state, said second interlocking portion interlocks with said second clutch-operating handle and said linking member shifts, and said first interlocking portion interlocks with said first clutch-operating handle and is shifted into the cutoff state.

4. The dual-bearing reel set forth in claim 1, wherein an aperture through which said spool can be passed is formed in said first side plate.

5. The dual-bearing reel set forth in claim 4, wherein said mechanism mounting plate is removably attached to said first side cover by screws.

6. The dual-bearing reel set forth in claim 1, further comprising an attach-blocking means for blocking attachment of said first side cover when said first clutch-operating handle is on the cutoff-state end and said first interlocking portion is on the transmission-state end.

7. The dual-bearing reel set forth in claim 1, further comprising a first urging member for urging said second clutch-operating handle into the cutoff state.

8. The dual-bearing reel set forth in claim 7, further comprising a second urging member for urging said first clutch-operating handle into the transmission state.

9. The dual-bearing reel set forth in claim 1, further comprising a first urging member for urging said second clutch-operating handle into the transmission state.

10. The dual-bearing reel set forth in claim 1, further comprising a clutch restoring mechanism for restoring, when said clutch mechanism is in the cutoff state, said clutch mechanism to the transmission state in cooperation with rotation of said handle in its line-retrieving direction.

* * * * *